United States Patent
Hwang

(10) Patent No.: US 8,051,933 B2
(45) Date of Patent: Nov. 8, 2011

(54) SLIDING APPARATUS OF COOLING MODULE FOR VEHICLES

(75) Inventor: Chang Sup Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 236 days.

(21) Appl. No.: 12/619,511

(22) Filed: Nov. 16, 2009

(65) Prior Publication Data

US 2010/0320020 A1 Dec. 23, 2010

(30) Foreign Application Priority Data

Jun. 18, 2009 (KR) .................. 10-2009-0054287

(51) Int. Cl.
*B60K 11/04* (2006.01)
(52) U.S. Cl. ...................................... 180/68.4; 180/68.6
(58) Field of Classification Search .................. 180/68.4, 180/68.6; 296/203.02, 193.09, 194
See application file for complete search history.

(56) References Cited

U.S. PATENT DOCUMENTS

| | | | | |
|---|---|---|---|---|
| 1,189,562 A | * | 7/1916 | Groehn et al. ............... | 180/68.4 |
| 4,066,119 A | * | 1/1978 | Stedman .......................... | 165/41 |
| 6,260,609 B1 | * | 7/2001 | Takahashi ....................... | 165/69 |
| 6,364,403 B1 | * | 4/2002 | Ozawa et al. ............. | 296/187.09 |
| 7,036,617 B2 | * | 5/2006 | Harada ........................ | 180/68.4 |
| 7,861,988 B2 | * | 1/2011 | Hamida et al. ................ | 248/232 |
| 7,942,223 B2 | * | 5/2011 | Obayashi et al. ............. | 180/68.4 |
| 2001/0001994 A1 | * | 5/2001 | Enomoto et al. ............. | 180/68.4 |
| 2006/0213639 A1 | * | 9/2006 | Kobayashi et al. ............. | 165/67 |
| 2010/0078149 A1 | * | 4/2010 | Yoshimitsu et al. ............ | 165/67 |

* cited by examiner

*Primary Examiner* — John R Olszewski
(74) *Attorney, Agent, or Firm* — Morgan, Lewis & Bockius LLP

(57) ABSTRACT

A sliding apparatus of a cooling module for a vehicle, constructed so that the cooling module slides in a rearward direction of the vehicle when a front impact force acts on the cooling module mounted to a front end module, may include a slide slot formed in a longitudinal direction of the vehicle, a bushing unit slidably coupled to the slide slot, and a rotary arm supporting at a first end portion thereof a back portion of the bushing unit wherein the rotary arm supports the bushing unit in a forward direction of the vehicle while the bushing unit moves along the slide slot in the rearward direction of the vehicle by the front impact force when the front impact force exceeding a coupling force applied to a second end portion of the rotary arm is transmitted from the bushing unit to the rotary arm.

11 Claims, 8 Drawing Sheets

SLIDING APPARATUS OF COOLING MODULE FOR VEHICLES

CROSS-REFERENCE TO RELATED APPLICATIONS

The present application claims priority to Korean Patent Application Number 10-2009-0054287 filed on Jun. 18, 2009, the entire contents of which application is incorporated herein for all purpose by this reference.

BACKGROUND OF THE INVENTION

1. Field of the Invention

The present invention relates to a sliding apparatus of a cooling module for a vehicle, which allows the cooling module to slide rearwards when impact force is transferred to the cooling module (a radiator or a condenser) mounted to the front portion of the vehicle, thus preventing the cooling module from being damaged.

2. Description of Related Art

Recently, module systems which combine several parts into one unit package have gradually been increasing in number so as to reduce the number of assembling processes when a vehicle is manufactured, thus reducing manufacturing costs and a manufacturing defective ratio. Thereby, a front bumper, a radiator and an air-conditioning condenser (a cooling module), and a head lamp are mounted to a front end module (FEM) in the form of a package.

FIG. 1 is a plan view illustrating a conventional cooling module mounted to a front end module, FIG. 2 is an enlarged view illustrating the important parts of a conventional sliding structure of the cooling module, and FIG. 3 is an operation view illustrating the state in which the cooling module slides when impact force acts on the conventional cooling module.

First, as shown in FIGS. 1 and 2, the conventional cooling module 10 for a vehicle, such as a radiator or a condenser, is mounted to the front end module 30 via a mounting bracket 20. A bumper back beam 1 is placed in front of the front end module 30 so that a bumper is installed to the bumper back beam 1.

Here, if the cooling module 10 is completely fixed to the front end module 30, the cooling module 10 may be damaged when impact force acts on the cooling module 10. Thus, when the impact force is transferred, the cooling module 10 slides in the transferred direction of the impact force (generally, the rear portion of the vehicle), so that the damage to the cooling module 10 is prevented.

As shown in FIG. 2, the sliding structure for the cooling module 10 includes a slide slot 21 which is formed in the mounting bracket 20 in the longitudinal direction of the vehicle. A bushing 11 extending from the cooling module 10 is fitted into the slide slot 21.

The bushing 11 is an elastic member which is elastically deformable. In the state where the bushing 11 is fitted into the slide slot 21 as shown in FIG. 2, the lower surface of the bushing 11 is in close contact with the upper surface of the mounting bracket 20. FIG. 2 shows a normal state before impact force is transferred to the cooling module 10.

When impact force is transferred to the cooling module 10 in the normal state of FIG. 2, the bushing 11 extending from the cooling module 10 moves to the rear portion of a vehicle body along the slide slot 21, so that the state of FIG. 3 is obtained. At this time, since the impact force transferred to the cooling module 10 is larger than frictional force between the bushing 11 and the mounting bracket 20, the bushing 11 slides rearwards.

As such, when the cooling module 10 is subjected to the impact force, the cooling module 10 slides rearwards, so that the damage to the cooling module 10 is prevented or minimized.

However, the conventional sliding structure for the cooling module 10 is problematic in that the cooling module 10 is supported only by the frictional force between the bushing 11 and the mounting bracket 20 in the normal state where impact force does not act on the cooling module 10, so that vibration and noise may be generated due to the cooling module 10 being weakly mounted, and the cooling module 10 may undesirably slide rearwards when the vehicle starts suddenly.

The problems become more serious when the bushing 11 hardens because of deterioration of the bushing 11. Actually, owners having older vehicles complain about the vibration and noise which are generated in the bushing 11 of the cooling module 10, so that there is a pressing need for overcoming the problem of the vibration and noise.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a sliding apparatus of a cooling module for a vehicle, which allows the cooling module to slide rearwards when impact force is transferred to the cooling module, thus preventing the cooling module from being damaged, and which ensures sufficient support strength, thus preventing the cooling module from being undesirably moved in a normal state before the impact force is transferred thereto.

In an aspect of the present invention, a sliding apparatus of a cooling module for a vehicle, constructed so that the cooling module slides in a rearward direction of the vehicle when a front impact force acts on the cooling module mounted to a front end module, may include a slide slot formed in a longitudinal direction of the vehicle, a bushing unit slidably coupled to the slide slot, and a rotary arm supporting at a first end portion thereof a back portion of the bushing unit wherein the rotary arm supports the bushing unit in a forward direction of the vehicle while the bushing unit moves along the slide slot in the rearward direction of the vehicle by the front impact force when the front impact force exceeding a coupling force applied to a second end portion of the rotary arm is transmitted from the bushing unit to the rotary arm.

The second end portion of the rotary arm may be offset from the longitudinal axis of the sliding slot.

The first end portion of the rotary arm may have a curved portion which surrounds a portion of an outer circumference of the bushing unit to increase a contact area with the bushing unit, thus increasing support strength of the bushing unit.

The slide slot may be formed in the front end module and the second end portion of the rotary arm is pivotally attached to the front end module.

The sliding apparatus may further include a coupling force adjustment member to control the coupling force applied between the second end portion of the rotary arm and the front end module, wherein the coupling force adjustment member is a bolt that pivotally couples the second end portion of the rotary arm to the front end module.

A stopper may be provided at the second end portion of the rotary arm, and a slot is formed at a predetermined position in the front end module and has a length corresponding to a moving locus of the stopper, so that the stopper is slidably coupled to the slot and stopped by either of opposite ends of the slot, thus preventing the rotary arm from rotating about the bolt.

In another aspect of the present invention, the slide slot may be formed in a mounting bracket coupled to the front end module and the second end portion of the rotary arm is pivotally attached to the mounting bracket.

The sliding apparatus may further include a coupling force adjustment member to control the coupling force applied between the second end portion of the rotary arm and the mounting bracket, wherein the coupling force adjustment member is a bolt that pivotally couples the second end portion of the rotary arm to the mounting bracket.

A stopper may be provided at the second end portion of the rotary arm, and a slot is formed at a predetermined position in the mounting bracket and has a length corresponding to a moving locus of the stopper, so that the stopper is slidably coupled to the slot and stopped by either of opposite ends of the slot, thus preventing the rotary arm from rotating about the bolt.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
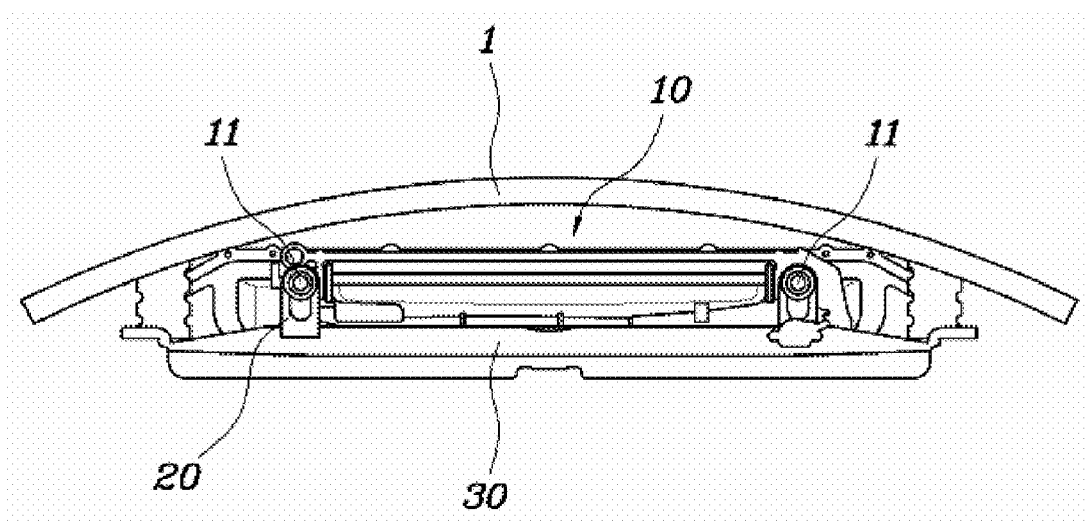
FIG. 1 is a plan view illustrating a conventional cooling module mounted to a front end module.
Figure 2:
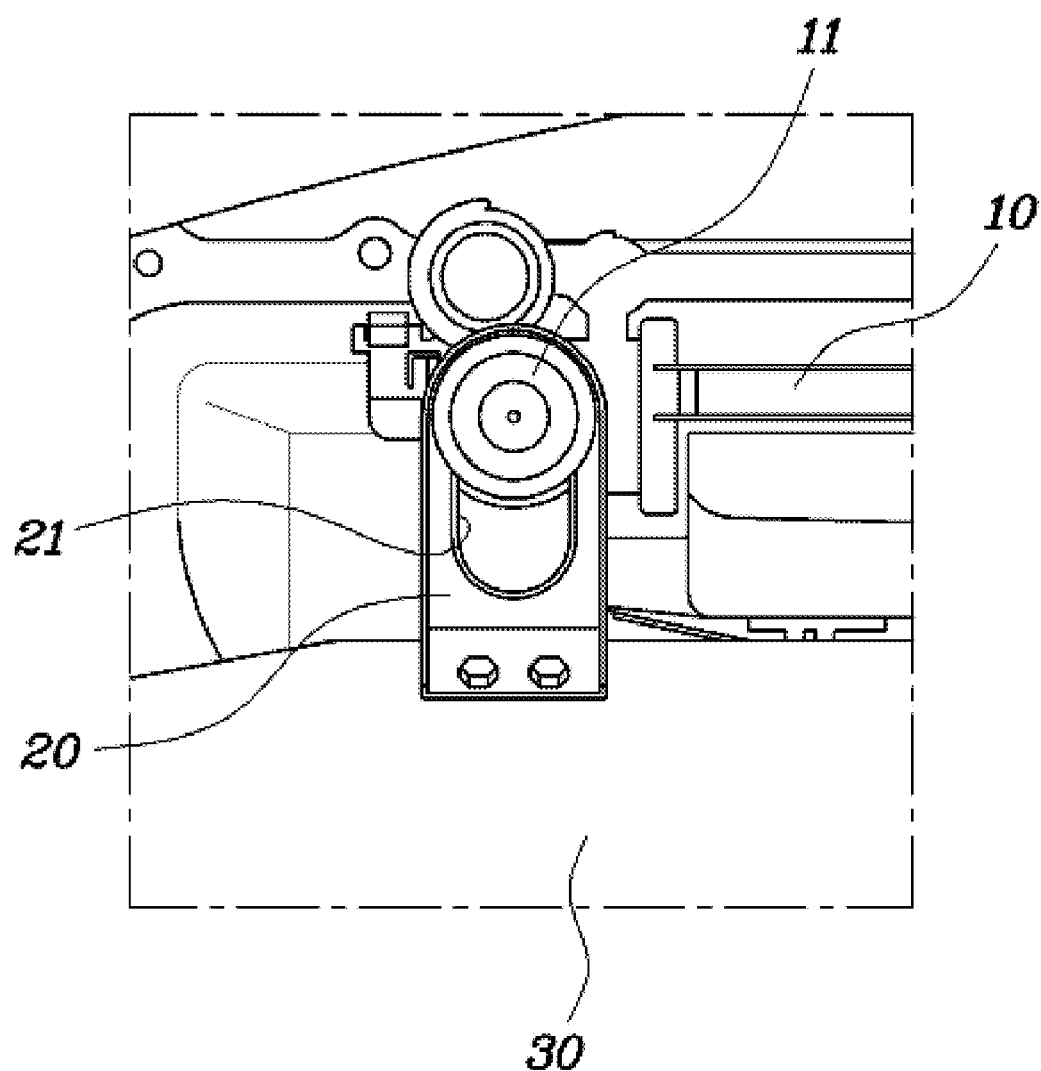
FIG. 2 is an enlarged view illustrating the important parts of a conventional sliding structure of the cooling module.
Figure 3:
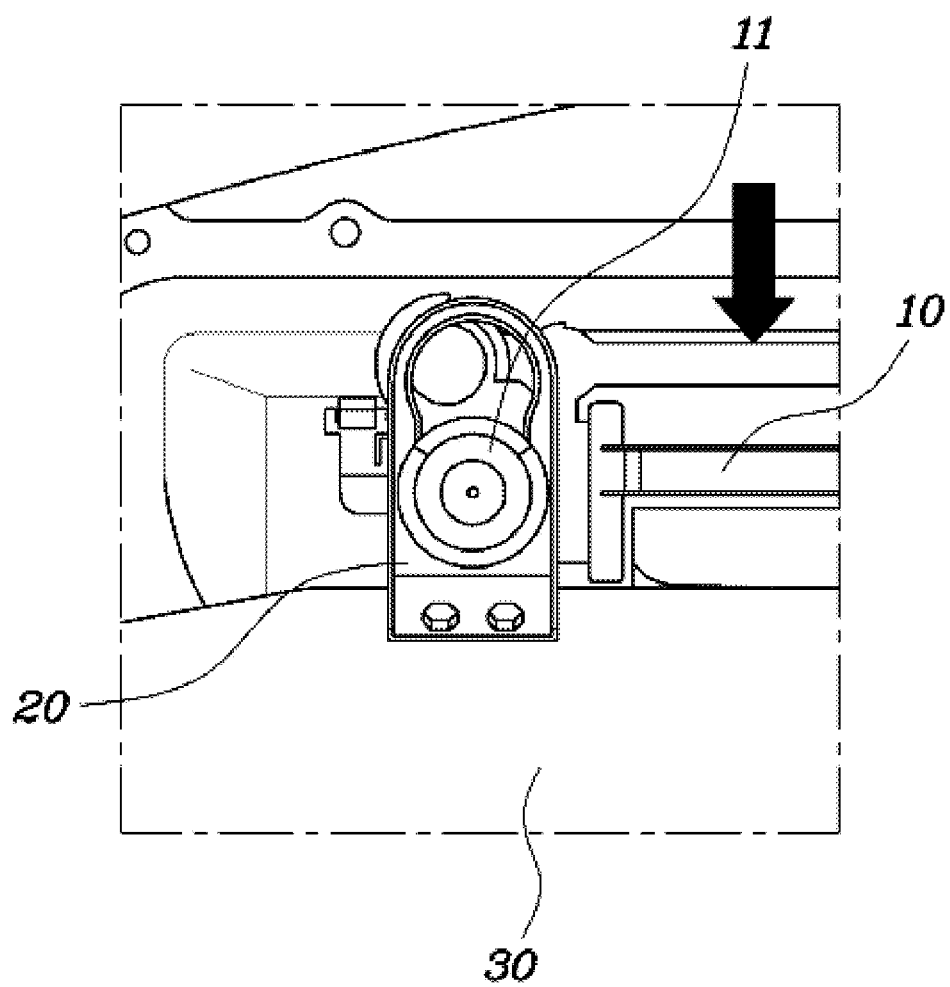
FIG. 3 is an operation view illustrating the state in which the cooling module slides when impact force acts on the conventional cooling module.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, various exemplary embodiments of the present invention will be described in detail with reference to the accompanying drawings.

Figure 4A:
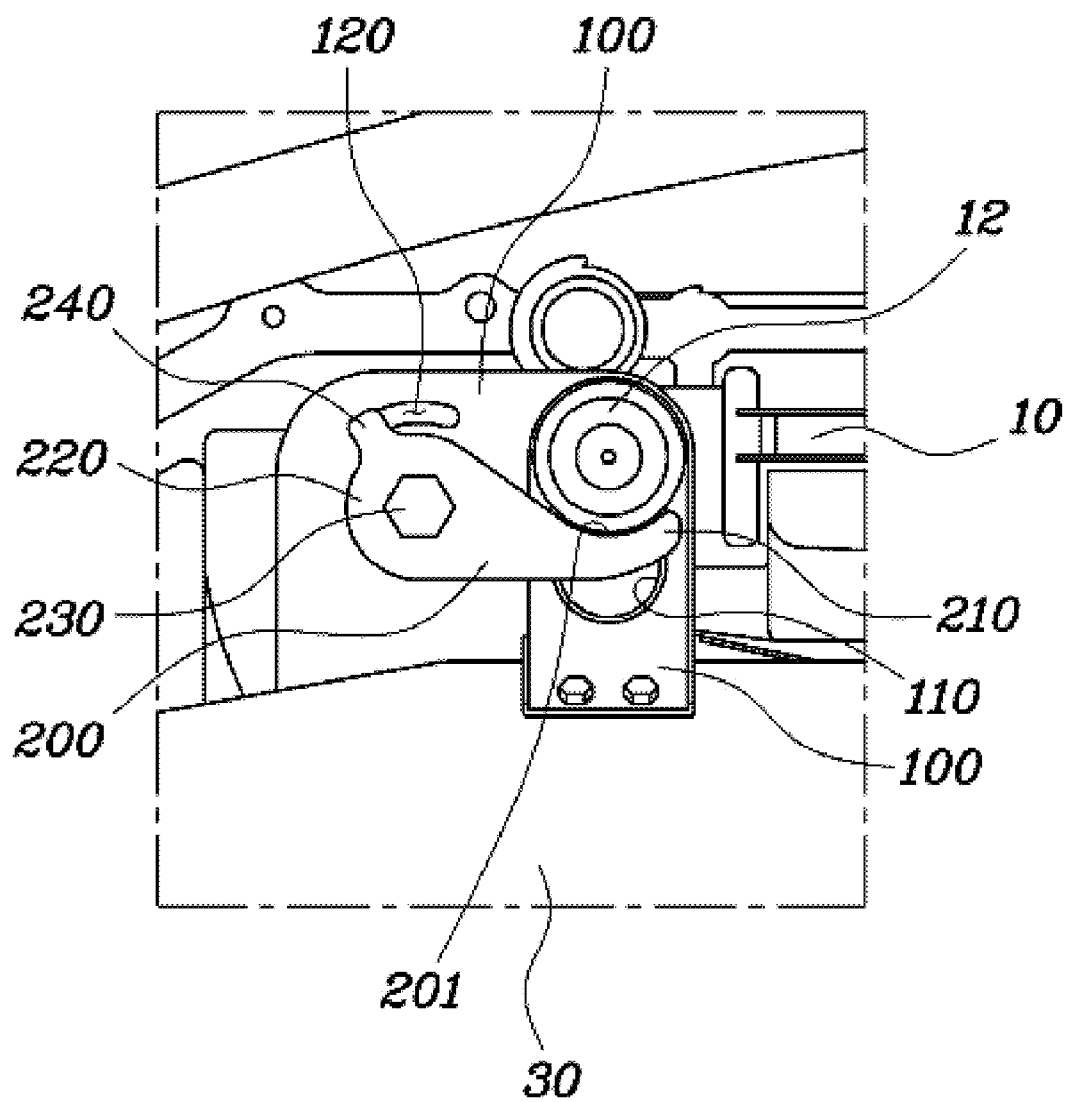
FIG. 4A is a view illustrating the construction of a sliding apparatus of a cooling module mounted to a front end module via a mounting bracket according to the exemplary embodiment of the present invention.
Figure 5:
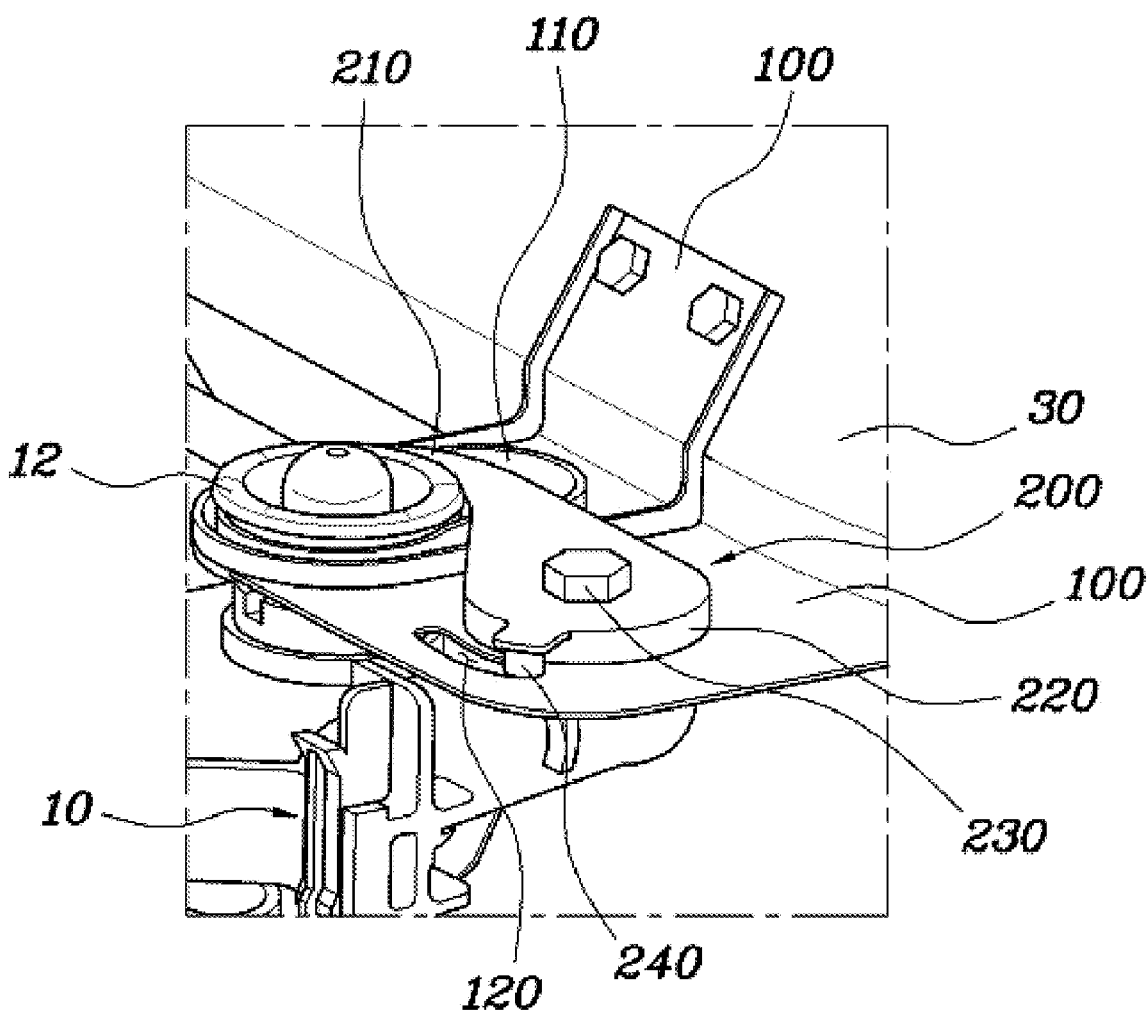
FIG. 5 is a perspective view illustrating the sliding apparatus according to the exemplary embodiment of the present invention when seen from a different angle.
Figure 6:
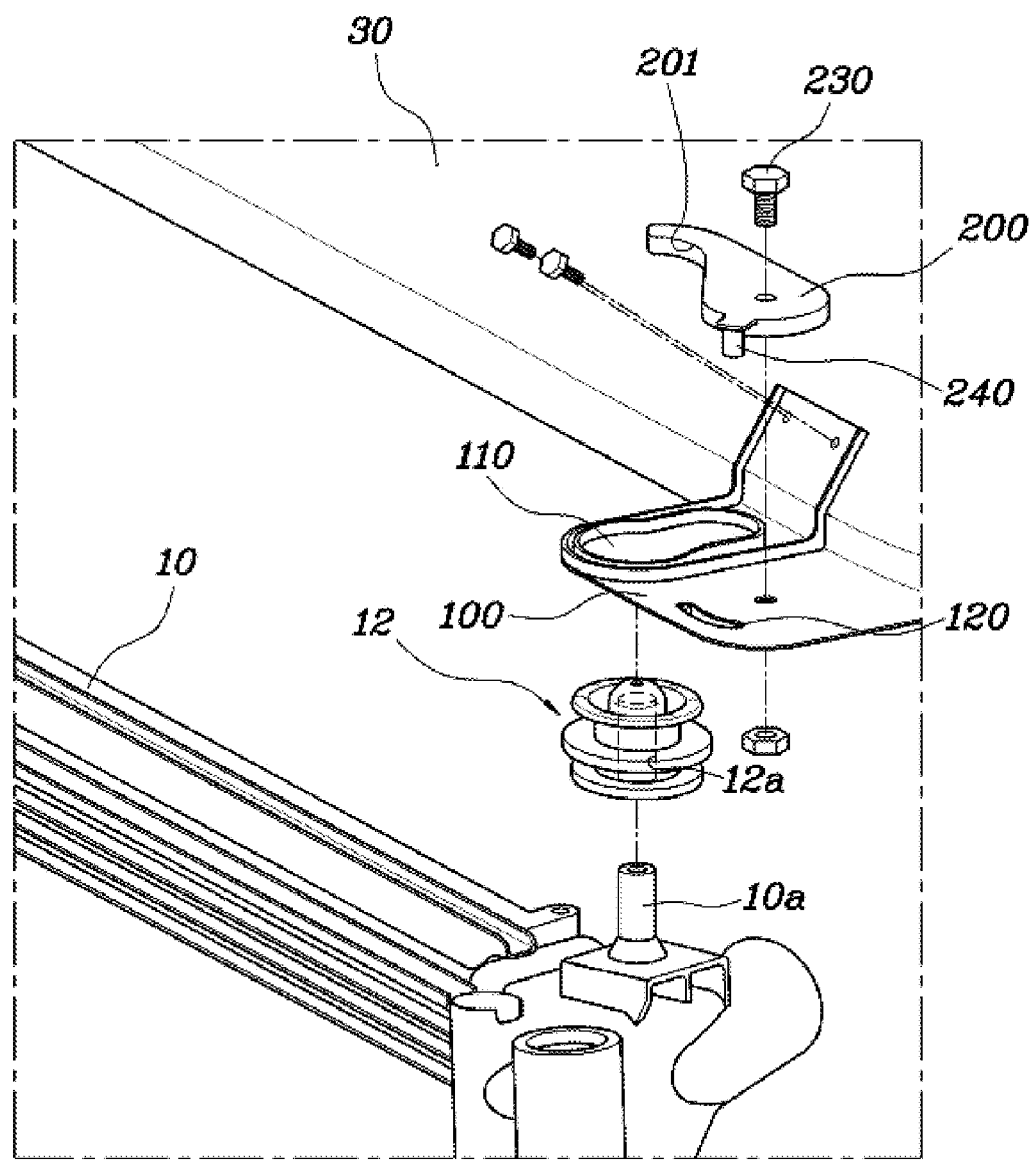
FIG. 6 is an exploded perspective view illustrating the sliding apparatus according to the exemplary embodiment of the present invention.
Figure 7:
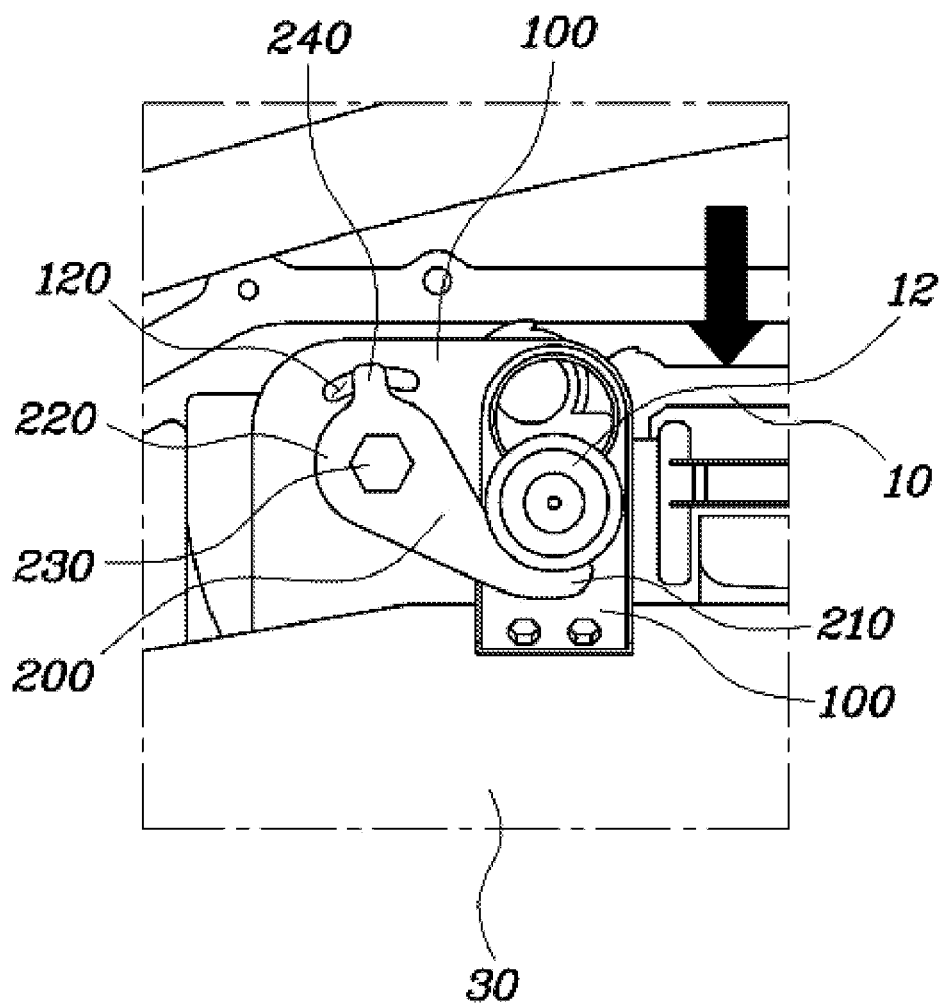
FIG. 7 is a view illustrating the operation of the sliding apparatus according to the present invention.

FIGS. 4A and B are views illustrating the construction of a sliding apparatus of a cooling module coupled directly and indirectly to the front end module respectively according to various exemplary embodiments of the present invention, FIG. 5 is a perspective view illustrating the sliding apparatus according to the exemplary embodiment of the FIG. 4A when seen from a different angle, FIG. 6 is an exploded perspective view illustrating the sliding apparatus according to the exemplary embodiment of FIG. 4A, and FIG. 7 is a view illustrating the operation of the sliding apparatus according to the exemplary embodiment of the FIG. 4A of the present invention.

As shown in FIGS. 4A and B, the present invention is directed to the sliding apparatus of the cooling module for the vehicle, which is constructed so that the cooling module 10 slides rearwards when front impact force is transferred to the cooling module 10 mounted to a front end module 30. Especially, before the impact force is transferred, vibration, noise or abnormal movement does not occur in the cooling module 10 because the cooling module 10 is strongly attached.

Figure 4B:
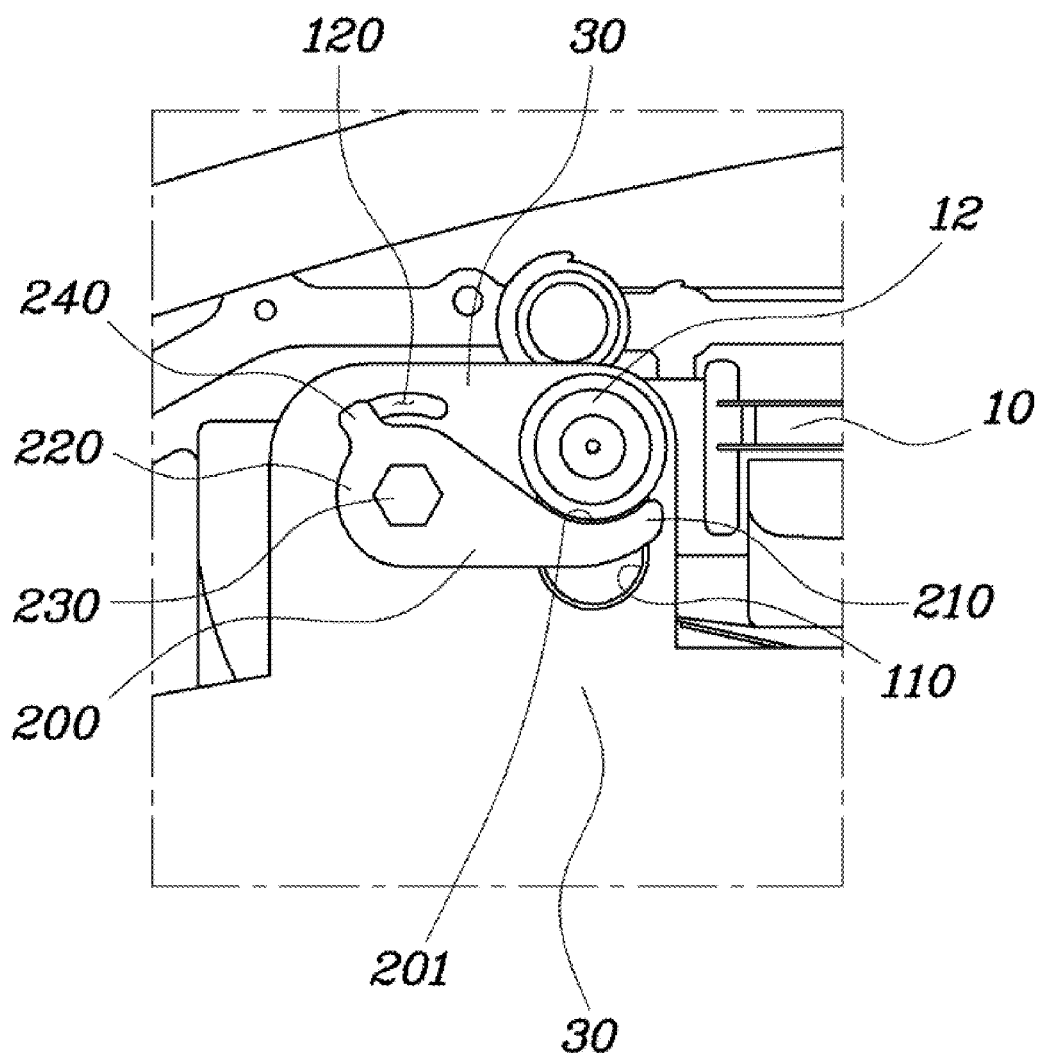
FIG. 4B is a view illustrating the construction of a sliding apparatus of a cooling module mounted to the front end module directly.

As shown in FIGS. 4A, 4B and 5, according to various exemplary embodiments of the present invention, the sliding apparatus includes a slide slot 110, a bushing unit 12, and a rotary arm 200. The slide slot 110 is formed in the direction to which the front impact force is transferred.

In an exemplary embodiment of the present invention, when the cooling module 10 is indirectly mounted to the front end module 30 via a mounting bracket 100, the slide slot 110 may be formed in the mounting bracket 100 as shown in FIG. 4A. Meanwhile when the cooling module 10 is directly mounted to the front end module 30, the slide slot 110 is formed in the front end module 30 as shown in FIG. 4B, Since the exemplary embodiment of the present invention in FIG. 4B is similar to the exemplary embodiment in FIG. 4A, except that the cooling module 10 is directly mounted to sliding slot 110 formed to the front end module 30, the detailed explanation will be omitted.

In FIG. 4A, according to this exemplary embodiment, the cooling module 10 is mounted to the front end module 30 via the mounting bracket 100. Thus, in the drawings, the slide slot 110 is formed in the mounting bracket 100. However, the sliding apparatus of this invention is not limited to this configuration.

Further, the bushing unit 12 is an elastic member which is coupled to a side of the cooling module 10 in such a way as to extend to the mounting bracket 100. After the bushing unit 12 is fitted into the slide slot 110 of the mounting bracket 100, the bushing unit 12 is supported in the slide slot 110 by the rotary arm 200. If the cooling module 10 is subjected to front impact force when the bushing unit 12 is located in the slide slot 110, the bushing unit 12 slides rearwards along the slide slot 110.

The bushing unit 12 is placed in the slide slot 110 in such a way as to protrude from the mounting bracket 100 by a predetermined height as shown in FIG. 5. Part of the upper portion of the bushing unit 12 is formed to be larger than the width of the slide slot 110 in order to prevent the bushing unit 12 from being removed from the slide slot 110 and moved to the cooling module 10.

FIG. 6 is an exploded perspective view illustrating the sliding apparatus according to the exemplary embodiment of FIG. 4A. Referring to the drawing, a bushing mounting bar 10a is provided on at least one of both sides of the upper portion and both sides of the lower portion of the cooling module 10 in such a way as to protrude in a vertical direction. Further, a mounting hole 12a is formed in the bushing unit 12 so that the bushing mounting bar 10a is inserted into the bushing unit 12.

The bushing mounting bar 10a is constructed so that the bushing unit 12 is mounted to the cooling module 10. The bushing mounting bar 10a may be provided only on both sides of the upper portion or both sides of the lower portion of the cooling module 10, because the cooling module 10 moves rearward obliquely when front impact force is transferred thereto. However, it is preferable that bushing mounting bars be provided on both sides of the upper portion and both sides of the lower portion of the cooling module 10 so as to minimize damage to the cooling module 10.

Further, as the bushing mounting bar 10a is fitted into the mounting hole 12a of the bushing unit 12, the bushing unit 12 moves integrally with the cooling module 10. Thus, when the cooling module 10 is moved rearwards by front impact force, the bushing unit 12 also moves rearwards.

Meanwhile, the rotary aim 200 serves to increase the support strength of the bushing unit 12 in a normal mounting state in which impact force is not transferred to the cooling module 10. A first end portion 210 of the rotary arm 200 supports the back of the bushing unit 12, while a second end portion 220 is attached to hold the supporting force. When external force exceeding a preset force is transmitted from the bushing unit 12 to the first end portion 210 of the rotary arm 200, the rotary arm 200 rotates about the attaching point of the second end portion 220 of the rotary arm 200, so that the bushing unit 12 slides rearwards along the slide slot 110.

As shown in the drawings, the first end portion 210 of the rotary arm 200 preferably has a curved portion 201 which surrounds part of the outer circumference of the bushing unit 12 to increase a contact area between the rotary arm 200 and the bushing unit 12, thus increasing the support strength of the bushing unit 12.

The bushing unit 12 has a circular shape as shown in the drawings. Thus, when the first end portion 210 of the rotary aim 200 is constructed to surround part of the outer circumference of the bushing unit 12, that is, to have the curved portion 201, the contact area is increased relatively in comparison with a plane structure contacting the circular bushing unit 12, thus increasing the support force of the bushing unit 12. Thereby, vibration and noise of the bushing unit 12 are reduced, and the bushing unit 12 is prevented from being moved rearwards by a force smaller than impact force such as that of a sudden start.

Meanwhile, the second end portion 220 of the rotary aim 200 is attached as described above. In this regard, the second end portion 220 is not fixed completely so that it never rotates, but the second end portion 220 is preferably attached by a coupling force which is smaller than the impact force acting on the cooling module 10.

Thus, when a predetermined impact force acts on the cooling module 10 even though the second end portion 220 of the rotary aim 200 is attached, the bushing unit 12 pushes rearwards the first end portion 210 of the rotary arm 200 as a result of the force, so that the second end portion 220 of the rotary aim 200 also rotates. However, if force transmitted from the bushing unit 12 to the rotary arm 200 is smaller than a typical impact force, the second end portion 220 of the rotary aim 200 is not rotated but is attached, thus supporting the bushing unit 12.

Thus, the coupling force of the second end portion 220 of the rotary arm 200 must be set so that the second end portion 220 rotates only when rotating force exceeding a predetermined force acts on the rotary aim 200. According to the exemplary embodiment of the present invention, the second end portion 220 of the rotary arm 200 is fastened using a bolt 230, and the bolt 230 is tightened with a predetermined torque so that the rotary arm 200 is not rotated as long as rotating force exceeding the tightening torque does not act on the bolt 230.

According to the experiment, when energy caused by front collision acts on the cooling module, a force acting on the bolt 230 which is provided on the second end portion 220 of the rotary arm 200 is about 665N. Hence, the tightening torque is preferably set such that the bolt 230 is loosened only when force exceeding 665N acts on the bolt 230 but is not loosened when a force less than 665N acts on the bolt 230. The tightening torque of the bolt 230 varies because a distance between the first end portion of the rotary arm 200 to which force is input and the second end portion of the rotary arm 200 to which the bolt is fastened varies according to the size of the rotary arm 200. The tightening torque may be calculated by multiplying the force from 660 to 670N by the distance between the first end portion of the rotary arm to which force inputs and the second end portion of the rotary arm 200 to which the bolt is fastened.

Preferably, a restraint device is provided to prevent the rotary arm 200 from being rotated in the tightening direction of the bolt 230 when the tightening torque acts on the bolt 230. Thus, a stopper 240 is provided on a surface of the rotary arm 200 to rotate integrally with the rotary arm 200. A slot 120 is formed to correspond to a moving locus of the stopper 240 and has a length corresponding to the moving locus. When the bolt 230 is fastened, the stopper 240 is stopped by either of opposite ends of the slot 120, thus preventing the rotary arm 200 from being rotated in the tightening direction of the bolt 230.

According to the embodiment of the present invention, the slot 120 is formed at a predetermined position on the mounting bracket 100. But, it is not necessary to form the slot 120 in the mounting bracket 100, and the slot 120 may be formed at any place corresponding to the stopper 240.

Thus, as shown in FIG. 4A, when the second end portion 220 of the rotary arm 200 is tightened by the bolt 230 with the first end portion 210 of the rotary arm 200 supporting the back of the bushing unit 12, the stopper 240 is inserted into the slot 120 so as to prevent the rotary aim 200 from rotating in the tightening direction, so that it is easy to install the rotary arm 200.

Here, the bolt 230 of the rotary arm 200 uses a left-hand thread bolt which is tightened when it is rotated counterclockwise.

When impact force is transferred to the cooling module 10 in the normal mounting state before the impact force is transferred as shown in FIG. 4, the bushing unit 12 pushes the first end portion 210 of the rotary arm 200 positioned behind the bushing unit 12 with a predetermined rotating force. At this time, if rotating force acting on the first end portion 210 of the rotary aim 200 is larger than tightening torque of the bolt 230 for fastening the second end portion 220 of the rotary arm 200, the second end portion 220 of the rotary arm 200 rotates about the bolt 230 and the entire cooling module 10 slides to the rear portion of a vehicle body as shown in FIG. 7, thus preventing the cooling module 10 from being damaged.

As described above, the present invention provides a sliding apparatus of a cooling module for a vehicle, in which a rotary arm firmly supports the back of a bushing unit of the cooling module, so that the cooling module never moves before impact force is transferred to the cooling module, thus preventing noise and vibration occurring in the conventional cooling module and preventing the cooling module from being pushed rearwards following a sudden start. Further, when impact force is transferred to the cooling module, the bushing unit slides rearwards while rotating a rotary arm, thus preventing the cooling module from being damaged.

For convenience in explanation and accurate definition in the appended claims, the terms "upper", "lower", "front", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sliding apparatus of a cooling module for a vehicle, constructed so that the cooling module slides in a rearward direction of the vehicle when a front impact force acts on the cooling module mounted to a front end module, the sliding apparatus comprising:
   a slide slot formed in a longitudinal direction of the vehicle;
   a bushing unit slidably coupled to the slide slot; and
   a rotary arm supporting at a first end portion thereof a back portion of the bushing unit wherein the rotary arm supports the bushing unit in a forward direction of the vehicle while the bushing unit moves along the slide slot in the rearward direction of the vehicle by the front impact force when the front impact force exceeding a coupling force applied to a second end portion of the rotary arm is transmitted from the bushing unit to the rotary arm.

2. The sliding apparatus as set forth in claim 1, wherein the second end portion of the rotary arm is offset from the longitudinal axis of the sliding slot.

3. The sliding apparatus as set forth in claim 1, wherein the first end portion of the rotary arm has a curved portion which surrounds a portion of an outer circumference of the bushing unit to increase a contact area with the bushing unit, thus increasing support strength of the bushing unit.

4. The sliding apparatus as set forth in claim 1, wherein the slide slot is formed in the front end module and the second end portion of the rotary aim is pivotally attached to the front end module.

5. The sliding apparatus as set forth in claim 4, further including a coupling force adjustment member to control the coupling force applied between the second end portion of the rotary arm and the front end module.

6. The sliding apparatus as set forth in claim 5, wherein the coupling force adjustment member is a bolt that pivotally couples the second end portion of the rotary arm to the front end module.

7. The sliding apparatus as set forth in claim 6, wherein a stopper is provided at the second end portion of the rotary arm, and a slot is formed at a predetermined position in the front end module and has a length corresponding to a moving locus of the stopper, so that the stopper is slidably coupled to the slot and stopped by either of opposite ends of the slot, thus preventing the rotary arm from rotating about the bolt.

8. The sliding apparatus as set forth in claim 1, wherein the slide slot is formed in a mounting bracket coupled to the front end module and the second end portion of the rotary arm is pivotally attached to the mounting bracket.

9. The sliding apparatus as set forth in claim 8, further including a coupling force adjustment member to control the coupling force applied between the second end portion of the rotary arm and the mounting bracket.

10. The sliding apparatus as set forth in claim 9, wherein the coupling force adjustment member is a bolt that pivotally couples the second end portion of the rotary arm to the mounting bracket.

11. The sliding apparatus as set forth in claim 10, wherein a stopper is provided at the second end portion of the rotary arm, and a slot is formed at a predetermined position in the mounting bracket and has a length corresponding to a moving locus of the stopper, so that the stopper is slidably coupled to the slot and stopped by either of opposite ends of the slot, thus preventing the rotary arm from rotating about the bolt.

* * * * *